United States Patent [19]
Silbermann et al.

[11] Patent Number: 4,770,905
[45] Date of Patent: Sep. 13, 1988

[54] PROCESS FOR SURFACE MODIFICATION OF POLYMER ARTICLES

[75] Inventors: Joseph Silbermann, Old Bridge; Michael T. Burchill, Cranbury, both of N.J.

[73] Assignee: M&T Chemicals Inc., Woodbridge, N.J.

[21] Appl. No.: 945,595

[22] Filed: Dec. 23, 1986

[51] Int. Cl.$^4$ .............................................. B05D 5/00
[52] U.S. Cl. .................................... 427/160; 427/331; 427/336; 427/353; 427/377; 427/430.1; 427/434.2
[58] Field of Search ............... 427/160, 434.2, 430.1, 427/331, 336, 353, 377; 118/429, 428, 419

[56] References Cited

U.S. PATENT DOCUMENTS

| | | | |
|---|---|---|---|
| 3,043,709 | 7/1962 | Amborski | 117/7 |
| 3,192,074 | 6/1965 | Newhard | 118/419 |
| 3,297,462 | 1/1967 | Fanning | 117/33.3 |
| 3,519,462 | 7/1970 | Christian | 117/33.3 |
| 3,656,991 | 4/1972 | Blackwell et al. | 427/160 |
| 3,783,011 | 1/1974 | Chauffoureaux | 117/10 GR |
| 4,126,660 | 11/1978 | Lempkowicz et al. | 264/101 |
| 4,146,658 | 3/1979 | Humphrey | 427/160 |
| 4,323,597 | 5/1982 | Chilton | 117/160 |
| 4,349,607 | 9/1982 | Ching | 428/412 |
| 4,361,605 | 11/1982 | Takahashi et al. | 118/429 |

FOREIGN PATENT DOCUMENTS

2808005 8/1979 Fed. Rep. of Germany.
2808036 8/1979 Fed. Rep. of Germany.
39037 11/1975 Israel.

OTHER PUBLICATIONS

Katz, M. et al. A.C.S. Div. Org. Coatings & Plastics (1976) 36, (1) 202–206.
Katz, M. et al., Soc. Plast. Eng., Technical Papers (1976) 22, pp. 511–512.

*Primary Examiner*—Janyce Bell
*Attorney, Agent, or Firm*—S. A. Marcus; W. Katz

[57] ABSTRACT

A process for modifying the surface region of a polymer article by incorporating one or more ingredients therein. Such ingredients may be ultraviolet light stabilizers, antioxidants, anti-static agents, pigments and the like. The polymer article, e.g. a sheet of polyvinyl chloride, is immersed in a liquid (e.g. water) and the immersed article is contacted with a solution of the ingredient in a solvent. The liquid must be one which is non-aggressive towards the article and must also be immiscible with the solvent. Any residual solution remaining on the contacted surface may be displaced therefrom, preferably by directing a jet of water onto the contacted surface, while avoiding escape of any solvent into the atmosphere.

35 Claims, 1 Drawing Sheet

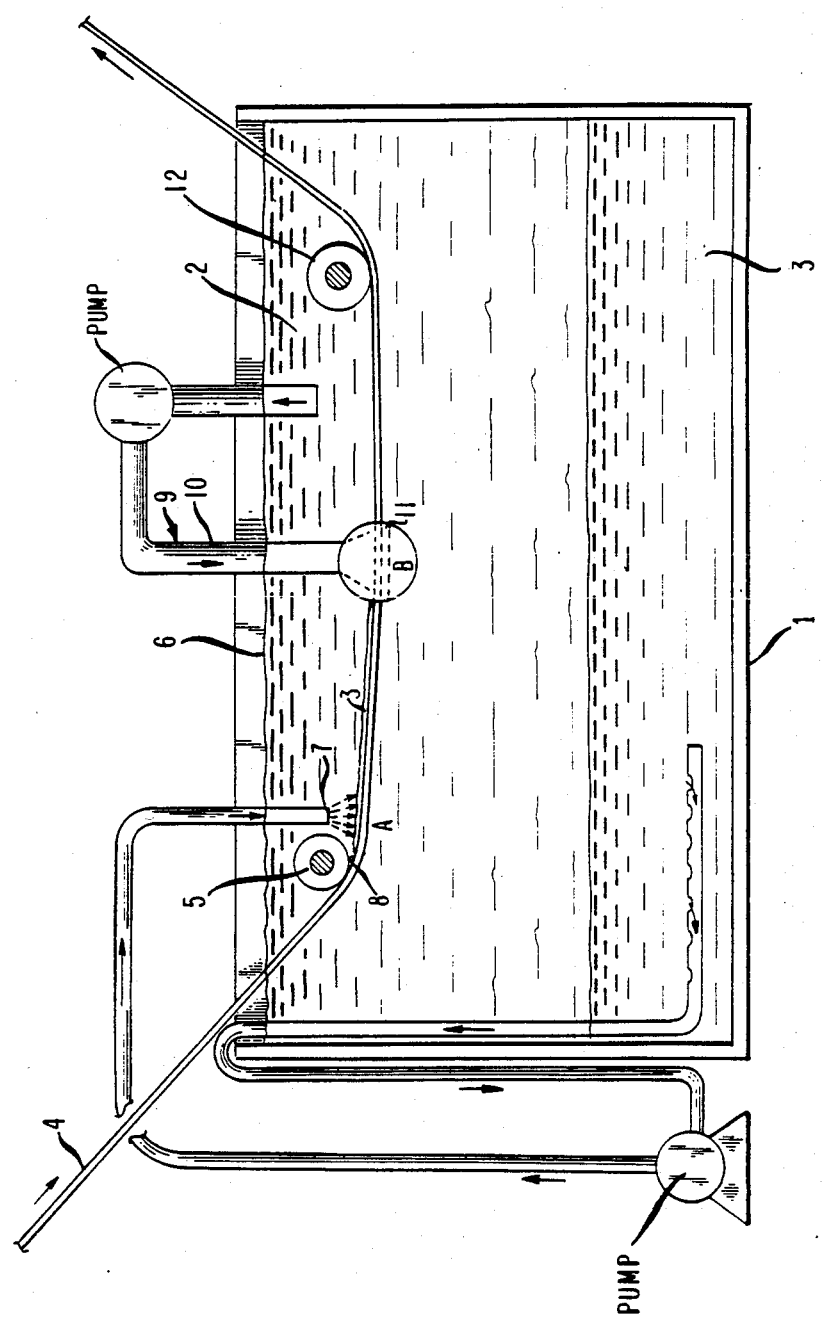

PROCESS FOR SURFACE MODIFICATION OF POLYMER ARTICLES

FIELD OF THE INVENTION

This invention pertains to a method of modifying the surface region of polymer articles such as solid polyvinyl chloride. Various ingredients, e.g. ultraviolet light stabilizers, may be incorporated in the articles down to a depth of about 200 microns, thereby protecting the article against degradative effects such as from ultraviolet light.

BACKGROUND OF THE INVENTION

It is known that various organic solvents have the ability to swell thermoplastic polymers such as polyvinyl chloride (hereinafter referred to as "PVC"). This property has been used to incorporate or infuse into the surface region of the article ingredients which will impart protection against the degradative effects of the atmosphere, especially ultraviolet light and oxygen.

It is common practice to protect articles such as PVC siding against the degradative effects of ultraviolet light by employing high levels of opacifying materials such as titanium dioxide as ultraviolet light screens. It is also known to incorporate ultraviolet light stabilizers in such articles to enhance their outdoor weatherability.

U.S. Pat. No. 3,297,462 discloses a process for rendering polymeric films resistant to the degradative effects of sunlight by immersing them in a solution of a benzophenone derivative in a mixture of diethylene glycol and glycerine followed by washing first in diethylene glycol and then in water. The polymers stated as being suitable for such treatment are those having a zero strength temperature of at least 200° C. This requirement excludes a number of useful polymers such as PVC. PVC films subjected to this treatment produced hazy samples due to softening and exhibited little or no improvement in weatherability.

Belgium Pat. No. 612,206 discloses a process for treating rigid PVC objects in order to stabilize them against the action of sunlight by immersing them in a swelling solvent containing a light stabilizing agent followed by evaporation of the solvent. This procedure is undesirable in that stabilizer is left on the surface of the objects, environmental hazards are created, and a product having a poor surface appearance is obtained.

U.S. Pat. No. 3,892,889 relates to a method of applying ultraviolet light stabilizers to polycarbonates in the form of an organic solvent solution followed by drying. Here too, the resultant polymers are marred by the presence of stabilizers deposited on the surface.

U.S. Pat. No. 4,323,597 pertains to a process for producing polycarbonates stabilized against ultraviolet light effects. The surface of the polycarbonate is contacted with a liquid carrier which is non-aggressive towards and wets the surface. There is no indication that the process is applicable towards other polymers such as PVC.

U.S. Pat. No. 3,519,462 describes the treatment of various polymers such as PVC with a solution of ultraviolet light stabilizers in a diol or triol. These solvents are quite inefficient, and further there is no mention of the need for removal of the excess solution.

Despite considerable past research aimed at protecting thermoplastic polymers such as PVC from the degradative effects of sunlight, there still exists a need for a method of treatment of polymer articles to provide such protection. Desirably, such process should be able to be carried out as a batch or continuous process (the latter is preferred) and be environmentally safe (i.e. the process should be capable of being carried out at ambient temperature and solvent concentration in the atmosphere should be below that permitted by regulation. In a typical PVC extrusion assembly line process, the maximum practical upper limit for contact time of PVC articles with stabilizing agents is about two minutes. Accordingly, the process must be capable of causing the requisite minimum of stabilizer to be incorporated in the surface region of the article (such minimum appears to be about 0.1 g per 100 g of article.)

It is an object of this invention to provide a method for incorporating various types of ingredients such as ultraviolet light stabilizers, antioxidants, anti-static agents, pigments, etc. into the surface region of polymer articles, especially those fabricated from thermoplastic polymers such as PVC.

It is also an object to render articles of solid PVC resistant to degradation by actinic radiation.

It is an additional object to achieve this end without leaving the surface of the articles softened, streaked, or coated with any of the ingredients incorporated therein.

It is a further object to provide an environmentally safe method which can be carried out in a continuous mode and which is adapted to commercial time restraints.

DESCRIPTION OF THE INVENTION

In its broadest sense, the method of this invention involves incorporating at least one ingredient in an article fabricated from a polymer by the steps of:
(a) immersing the article in a liquid; and
(b) contacting the immersed article with a solution of the ingredient in a solvent, the liquid being one which is non-aggressive towards the article and which is immiscible with the solvent.

The term "non-aggressive" is used herein to signify that the liquid will not dissolve, swell or otherwise react with the polymer and is to be considered inert towards the polymer.

In a preferred embodiment, the method comprises incorporating at least one ultraviolet light stabilizer in the surface region of an article fabricated from PVC by the steps of:
(a) transporting the article through an aqueous media;
(b) contacting substantially only one surface of the article with a solution of the stabilizer in an organic solvent while the article is being transported through the aqueous media, the aqueous media being one which is non-aggressive with the article and which is immiscible with the solvent; and
(c) displacing any residual solution remaining on the contacted surface.

Most preferably, the process is practiced in a continuous mode and involves incorporating at least one ultraviolet light stabilizer in the surface region of a sheet fabricated from PVC. The surface region extends to a depth of about 200 microns and the amount of stabilizer incorporated in this region will be at least 0.1 g, preferably 0.15 g to 0.6 g, per 100 g of PVC sheet, with at least 70% of such amount concentrated in the upper 100 microns of the surface region. This most preferred embodiment involves:
(a) transporting the sheet substantially horizontally through an upper water layer, there being a methylene chloride solution containing 1-10 wt. % of the stabilizer present as a layer beneath the water layer;
(b) flowing the solution from the bottom layer through the upper water layer onto substantially only one surface of the sheet as the sheet is being transported through the water layer such that the solution is in contact with the surface for a period of time ranging from 30 seconds to two minutes; and thereafter
(c) directing a jet of water onto the contacted surface to displace any residual solution on the surface.

In the preferred embodiment discussed above, it is desirable that the solution of stabilizer be pumped from the bottom layer to a height (e.g. 0.5-6 inches) above the surface which is to be contacted and the solution then allowed to flow downward through the water layer onto the surface. From an environmental point of view, it is preferred that the exit point of the conduit from which the solution flows is located within the water layer, thereby providing a "water seal" and avoiding escape of significant amounts of the solvent into the atmosphere. It is further preferred that the process be carried out at ambient temperature.

The preferred liquid in which the article is immersed is an aqueous media, i.e. water or a mixture or emulsion of water and other liquids which are incompatible with the solvent of choice. The term "incompatible" is defined herein to mean a material having a solubility of not greater than 15 percent by weight in the solvent and vice-versa at ambient temperature and pressure. Although water is the most preferred liquid, mixtures of water and methanol have also been found to be quite useful.

In order to insure that the contacted surface exhibits no softening or coating of stabilizer, it is desirable that any residual solution on the surface be displaced therefrom as the sheet is being removed from the water layer. Such displacement is conveniently effected by directing a jet (or a multiplicity of jets) of water onto the contacted surface. The jet(s) of water may also be directed at the underside (i.e. the non-contacted surface) of the sheet to insure that any solution displaced from the contacted side does not flow to and remain on the non-contacted side.

The polymers most amenable to this process are thermoplastic polymers such as PVC (which is most preferred), polyolefins such as polyethylene and polypropylene, polystyrene, polycarbonates, thermoplastic polyesters such as polyethylene terephthalate and polybutylene terephthalate, thermoplastic acrylonitrile-/butadiene/styrene copolymers, polyacrylates, polymethacrylates and the like.

The ingredients which may be incorporated into the articles fabricated from such polymers include ultraviolet light stabilizers (which are preferred), anti-oxidants, anti-static agents, pigments and the like. The nature of such ingredients is not critical so long as they are compatible with the polymer and with the solvent of choice. Of course, the ingredients must be sufficiently soluble in the solvent of choice so as to cause the desired amount thereof to be incorporated in the polymer article.

In the preferred embodiment, the polymer is PVC and is transported in the form of a sheet through the upper water layer. The term "sheet" should be understood to mean not only a sheet in the conventional sense, but also a film, strip, ribbon, bar, rod, etc. Preferably the sheet is disposed substantially horizontally as it is being transported through the water layer. Regardless of whether the sheet is disposed substantially horizontally or substantially vertically (or at any intermediate angle) as it is being transported through the water layer, one or both surfaces of the sheet may be contacted with the solvent solution of the ingredient, i.e. the ultraviolet light stabilizer, to be incorporated in the surface region of the sheet. It is, however, preferred that only one surface be contacted by the solution; in the case of PVC sheet intended to be used as siding for buildings, the surface to be contacted with the solution will obviously be that which is to be exposed to the environment.

The concentration of the desired ingredient(s) in the solvent of choice is not critical. However, there should be a sufficient concentration and the time of contact with the solution should be such that at least about 0.1 g, preferably 0.15 g-0.6 g, per 100 g of the article is incorporated in the surface region thereof. Such concentration may vary from about 1 to about 60 wt. % or higher, but is preferably in the range of 10 to 40 wt. %. The contact time may be as low as one second, but is preferably in the range of 15 seconds to two minutes. Contact times of greater than two minutes are unnecessary and are commercially unrealistic.

As mentioned previously, it is the surface region of the polymer article which receives the desired ingredient(s). Typically, the surface region extends to a depth of about 200 microns. Preferably, at least about 70% of the amount of ingredient(s) incorporated in the surface region will be concentrated in the upper 100 microns of the surface region.

The solvent in which the ingredient is dissolved must be immiscible with the the liquid which is preferably water. Preferably, the solvent will have a solvent parameter of at least about 9 and its density will be greater than 1. Thus, the preferred solvent will lie as a bottom layer beneath the water layer. In this embodiment, the article is immersed in the water layer and the solvent solution of the desired ingredient(s) is directed to the article surface and, after contact with the surface, falls by gravity to the bottom of the container. Thus, the solvent is blocked from exposure to the atmosphere by the blanket of water above it.

Where the nature of the desired solvent does not pose any significant safety or environmental problems, or where such problems may be overcome by ventilation or other means, solvents having densities less than one may be used. In this case, the water layer will be on the bottom and the solvent solution is caused to flow upward through the water layer and contact the underside of the article and then rise to the top of the container and collect as a layer above the water layer. In either technique, the solvent solution may be recycled back to the point of entry into the treatment tank. Of course, a closed system would greatly reduce solvent losses and environmental problems due to solvent volatility.

Suitable organic solvents for use in the process are those which will meet two requirements: (a) immiscibility with the liquid (e.g. the aqueous media, especially water) and (b) capable of dissolving at least about 1 g of ingredient per 100 g of solvent. In general, the types of solvents which meet these two requirements are halogenated hydrocarbons containing up to three carbon atoms in a straight chain as well as aliphatic and cycloaliphatic ethers, esters and ketones.

Representative halogenated hydrocarbon include methylene chloride, chloroform, 1,2-dichloroethane, trichloroethylene, 1,1,1-trichloroethane, 1,1,2-trichloroethane, 2-chloro-2-methylpropane and the like. Chlorinated hydrocarbons having four or more carbon atoms such as 1,4-dichlorobutane and 1,5-dichloropentane are undesirable in that PVC sheets were not impregnated with ultraviolet light stabilizers when such hydrocarbons were employed as the organic solvents.

Exemplary ketones are 2-pentanone, 3-pentanone, 2-hexanone, 2,4-pentadione and the like.

Exemplary ethers include diethyl ether, dipropyl ether, dimethoxy ethane, furan, tetrahydropyran and the like.

Exemplary esters include ethyle acetate, n-butyl acetate and the like.

Mixtures of mutually miscible organic solvents can also be used. One can also use blends of these organic solvents mixed with solvents which alone could serve as solvents in this invention. For example, methylene chloride, ethyl acetate, 1,2-dichloroethane, and 2- or 3-pentanone can be blended with 2-heptanone, 2-octanone, 1,4-dichlorobutane or an arene such as toluene.

The preferred organic solvents employed in the process of this invention are methylene chloride, ethyl acetate, 2-pentanone and 3-pentanone, with methylene chloride being especially preferred.

The term "water-immiscible" as used herein means a solubility in water at ambient temperatures and pressures of no more than about 15% by volume. Since the acqueous media may contain materials besides water, even solvents with somewhat higher solubilities in water can be tolerated where their solubility in the acqueous solution would be lower than in pure water.

While ambient temperatures are preferred for economic reasons, higher as well as lower temperatures can also be used, if desired. There may be aproperty peculiar to a particular solvent which recommends a temperature other than ambient. For example, the solubility of ethyl acetate in water decreases with increasing temperature. Thus it may be advantageous to use higher processing temperatures than ambient room temperature when using this solvent.

Solvents which infuse only small amounts of ultraviolet light stabilizer into polymers such as PVC at room temperature can be readily used by raising the processing temperature.

The preferred ingredients for use in this invention are ultraviolet light stabilizers. Suitable UV stabilizers are represented by the following commercial materials:

Cyasorb UV 9: 2-hydroxy-4-methoxybenzophenone (Trademark of American Cyanamid Co.)

Cyasorb UV 531: 2-hydroxy-4-n-octoxybenzophenone (Trademark of American Cyanamid Co.)

Cyasorb UV 5411: 2(2'-hydroxy-5'-t-octylphenyl)-benzotriazole (Trademark of American Cyanamid Co.)

Irgastab 2002: a nickel phsophonate (Trademark of Ciba-Geigy Co.)

Sanduvor VSU: 2-ethyl-ethoxyanilide (Trademark of Sandoz Corp.)

Tinuvin P: 2(2'-hydroxy-5'-methylphenyl)-benzotirazole (Trademark of Ciba-Geigy Co.)

Tinuvin 326: 2-(3"-t-butyl-2'-hydroxy-5'-methylphenyl)-5-chlorobenzotraizole (Trademark of Ciba-Geigy Co.)

Tinuvin 144 and 770: Hindered Amine Light Stabilizers (Trademark of Ciba-Geigy Co. for HALS)

The following is a list of benzophenones and triazoles which may be used as UV stabilizers in the practice of this invention:
2,2'-dihydroxybenzophenone
2,2,4,4'-tetrahydroxybenzophenone
2,2'-dihydroxy-4,4'-dimethoxybenzophenone
2,2'-dihydroxy-4,4'-diethoxybenzophenone
2,2'-dihydroxy-4,4'-dipropoxybenzophenone
2,2'-dihydroxy-4,4'-dibutoxybenzophenone
2,2'-dihydroxy-4-methoxy-4'-ethoxybenzophenone
2,2'-dihydroxy-4-methoxy-4'-propoxybenzophenone
2,2'-dihydroxy-4-methoxy-4'-butoxybenzophenone
2,2'-dihydroxy-4-ethoxy-4'-propoxybenzophenone
2,3'-dihydroxy-4,4'-dimethoxybenzophenone
2,3'-dihydroxy-4-methoxy-4'-butoxybenzophenone
2-hydroxy-4,4,5'-trimethoxybenzophenone
2-hydroxy-4,4,6'-tributoxybenzophenone
2-hydroxy-4-butoxy-4,5'-dimethoxybenzophenone
2-hydroxy-4-ethoxy-2,4'-dibutylbenzophenone
2-hydroxy-4-propoxy-4,6'-dichlorobenzophenone
2-hydroxy-4-propoxy-4,6'-dibromobenzophenone
2,4-dihydroxybenzophenone
2-hydroxy-4-methoxybenzophenone
2-hydroxy-4-ethoxybenzophenone
2-hydroxy-4-propoxybenzophenone
2-hydroxy-4-butoxybenzophenone
2-hydroxy-4-methoxy-4'-methylbenzophenone
2-hydroxy-4-methoxy-4'-propylbenzophenone
2-hydroxy-4-methoxy-4'-butylbenzophenone
2-hydroxy-4-methoxy-4'-t-butylbenzophenone
2-hydroxy-4-methoxy-4'-chlorobenzophenone
2-hydroxy-4-methoxy-2'-chlorobenzophenone
2-hydroxy-4-methoxy-4'-bromobenzophenone
2-hydroxy-4,4'-dimethoxybenzophenone
2-hydroxy-4,4'dimethoxy-3-methylbenzophenone
2-hydroxy-4,4'-2'-ethylbenzophenone
2-hydroxy-4,4',5'-trimethoxybenzophenone
2-hydroxy-4-ethoxy-4'-methylbenzophenone
2-hydroxy-4-ethoxy-4'-ethylbenzophenone
2-hydroxy-4-ethoxy-4'-propylbenzophenone
2-hydroxy-4-ethoxy-4'-butylbenzophenone
2-hydroxy-4-ethoxy-4'-methoxybenzophenone
2-hydroxy-4,4'-diethoxybenzophenone
2-hydroxy-4-ethoxy-4'-propoxybenzophenone
2-hydroxy-4-ethoxy-4'-butoxybenzophenone
2-hydroxy-4-ethoxy-4'-chlorobenzophenone
2-hydroxy-4-ethoxy-4'-bromobenzophenone
2-hydroxyacetophenone
2,4-dihydroxyacetophenone
2-(2'-hydroxy-5'-methylphenyl)benzotriazole
2-(2'-hydroxy-5'-t-butylphenyl)benzotriazole
2-(2'-hydroxy-3'-methyl-5-t'-butylphenyl)benzotriazole
2-(2'-hydroxy-5'-cyclohexylphenyl)benzotriazole
2-(2'-hydroxy-3',5'-dimethylphenyl)benzotriazole
2-(2'-hydroxy-5'-t-butylphenyl)-5-chlorobenzotriazole
2-(2'-hydroxy-3'-di-t-butylphenyl)benzotriazole.

The preferred UV stabiliers for use in practicing this invention are: 2-(2'-hydroxy-5'-t-octylphenyl)benzotriazole, 2-(2'-hydroxy-5'-t-methylphenyl)benzotriazole, 2-hydroxy-4-methoxybenzophenone, 2-hydroxy-4-n-octoxybenzophenone, and 2-ethyl-2-ethoxyanelide.

DESCRIPTION OF THE DRAWING

The sole FIGURE is a schematic representation of an apparatus for practicing the process of this invention in a continuous mode. In the FIGURE, the upper layer liquid will be water, the ingredient will be a UV stabilizer which is dissolved in methylene chloride which will be present as a layer beneath the water layer. The article will be a PVC sheet oriented (preferably substantially horizontally) in an immersed state in the upper water layer. In the operation of such a two-layered system in a continuous mode, the stabilizer solution is pumped from the lower layer and applied to the top surface of the PVC sheet (the stabilizer solution preferentially flows through the water layer to contact the top surface). Excess stabilizer solution then falls off the surface and returns to the bottom layer by the action of gravity. The methylene chloride in the stabilizer solution is blocked from evaporating into the atmosphere by the blanket of water layer above it; this feature is advantageous for producing modified surfaces having a high degree of surface perfection, without any significant environmental problem occurring from the use of a highly volatile solvent such as methylene chloride.

The apparatus of the FIGURE includes tank 1 about ¾ full with upper water layer 2. Stabilizer solution 3, i.e. a UV stabilizer dissolved in methylene chloride, is present as the lower layer therein. A continuous PVC sheet 4 is fed into upper layer 2 at a pre-determined rate from below roller 5, which is positioned below surface 6 of upper layer 2.

Further ahead of roller 5, in what is referred to herein as the "application zone" A, a series of applicator nozzles 7 are oriented below surface level 6 with their orifices directed toward the upper surface 8 of sheet 4. Nozzles 7 continuously direct streams of stabilizer solution 3 onto surface 8, and the thus-applied stabilizer solution remains on surface 8 and effectively modifies the surface region of sheet 4. The length of time that stabilizer solution 3 remains on surface 8 within zone A is referred to herein as the "contact time" which has been discussed hereinabove.

Downstream of zone A is a "displacement zone" B in which residual stabilizer solution remaining on surface 8 is removed in situ, i.e. the displacement of the residual stabilizer solution from surface 8 is carried out without exposing the treated surface to the ambient atmosphere. Thus, the treated surface of sheet 4 remains under the surface 6 of water layer 2, thereby preventing any evaporation of the methylene chloride which would result in streaks of solid stabilizer on surface 8. For the purposes of the FIGURE, the time required for sheet 4 to travel from the point of zone A at which nozzles 7 first appear to the beginning of zone B is understood to be the "contact time".

In zone B, jet element 9 directs a spray of displacing liquid, preferably water from layer 2, at a pressure sufficient to displace residual stabilizer solution remaining on the treated surface of sheet 4. Jet element 9 comprises a hollow perforated rod 10 terminating in slit 11 through which sheet 4 is conveyed into zone B. A second roller 12 is located downstream of zone B and below the surface 6 of water level 2 to accept the thus-treated sheet 4 after it leaves zone B. Variable speed nip roller pullers (not shown) are positioned to move sheet 4 at a pre-determined speed through and out of tank 1, and sheet 4 can then be stored on a suitable take-up roll.

The invention will now be described with reference to the following examples in which the surface-modified article is prepared using the system shown in the FIGURE.

EXAMPLE 1

A solution of 7.5% by weight of Cyasorb U.V. 5411 stabilizer (Trademark of American Cyanamid Co.) in methylene chloride was applied to the upper surface of a horizontally supported, moving PVC strip immersed in water at 25° C. The applicator nozzles were directed vertically downward toward the upper surface of the strip from a position beneath the surface of the water layer. Thereupon stabilizer was absorbed into the surface region of the strip and excess solution fell to the bottom of the tank. The contact time was 24 seconds. Downstream of the application zone, a jet of water was applied to the treated surface to displace residual solution remaining on the surface of the strip. The thus-treated strip then exited the tank and was wound onto a take-up roll.

EXAMPLE 2

The UV stabilized PVC strip prepared in Example 1 was microtomed into 20 micron sections extending to a total depth of 200 microns from the surface. The amount of UV stabilizer in each of these sections was determined by means of high pressure liquid chromatography (HPLC) analysis. The results are set forth in Table I below.

TABLE I

| Microtomed Section (microns) | Weight % Stabilizer in Section | Amount of Stabilizer (g/sq. meter) | Total Amount of Stabilizer at Given Depth, g/sq. meter | % of Total Stablilizer at Given Depth |
|---|---|---|---|---|
| 0–20 | 2.30 | 0.64 | | |
| 20–40 | 1.91 | 0.52 | | |
| 40–60 | 1.70 | 0.47 | | |
| 60–80 | 1.47 | 0.40 | | |
| 80–100 | 1.40 | 0.38 | 2.42 | 71 |
| 100–120 | 1.30 | 0.36 | | |
| 120–140 | 1.17 | 0.32 | | |
| 140–160 | 0.62 | 0.17 | | |
| 160–180 | 0.32 | 0.09 | | |
| 180–200 | 0.14 | 0.04 | 3.39 | |

Process Conditions
Temperature: 25° C.
Contact time: 24 seconds
Strip speed: 1.5 feet/minute
Thickness of PVC strip: 1300 microns The results set forth in Table I indicate that 3.39 g sq. meters of stabilizer is incorporated in the surface region of one surface of the PVC strip extending to a depth of 200 microns. Of this amount, 71%, or 2.42 g/sq. meters is incorporated within the upper 100 microns of the surface region. Within the interior of the strip, i.e. from 200 to 1300 microns (the thickness of the strip) substantially no stabilizer is present. Furthermore, no significant amounts of solvent or residual stabilizer (less than 1% of each) are present on the treated surface of the strip. The treated strip exhibited a uniform surface, was non-tacky, had no streaks of solid material thereon, and retained its planarity and hardness.

EXAMPLE 3

Following the procedures of Examples 1 and 2, various concentrations of stabilizer solutions were applied onto the upper surface of the PVC sheet at pre-determined contact times. Table II shows the amount of stabilizer incorporated in the surface region of the sheet at the indicated stabilizer concentrations and contact times (the solvent was methylene chloride).

The protection afforded the sheet by the stabilizer is illustrated in Table II as changes in yellowness index, i.e. ΔYI values, which were determined by accelerated U.V. exposure tests according to ASTM G 53-84. A negative or zero value of ΔYI indicates no significant yellowness, while positive ΔYI values indicate yellowness caused by U.V. exposure.

TABLE II

| Sample No. | Stabilizer Conc., wt. % | Contact Time, seconds | Incorporated Amount of Stabilizer, g/sq. meters | ΔYI UV Exposure (in weeks) 1 | 4 |
|---|---|---|---|---|---|
| 1 | 2 | 30 | 1.78 | 1.3 | 4.1 |
| 2 | 3 | 30 | 2.67 | −2.9 | −2.0 |
| 3 | 3 | 60 | 3.38 | 2.2 | −0.4 |
| 4 | 5 | 15 | 5.16 | −1.0 | 0.3 |
| 5 | 5 | 30 | 5.34 | 0.0 | 1.2 |
| 6 | 5 | 60 | 7.12 | −0.8 | −1.0 |
| 7 | 10 | 15 | 11.22 | 0.7 | −1.1 |
| 8 | 10 | 30 | 9.80 | −1.0 | 0.9 |
| 9 | 10 | 60 | 16.86 | −0.6 | −1.4 |
| Control | 0 | 0 | 0 | 29 | 50 |

The results in Table II show that treatment of the PVC sheet with a stabilizer solution having a concentration of 2 wt. % for 30 seconds provides an amount of stabilizer incorporated in the surface region of the sheet sufficient to afford excellent protection against U.V.-induced degradation. At concentrations up to 10 wt. % of stabilizer, and with contact times of up to 60 seconds, even more effective protection is obtained. 1.78 g/m$^2$, 2.67 g/m$^2$ and 11.22 g/m$^2$ are equivalent to 0.1 g/100 g, 0.15 g/100 g. and 0.6 g/100 g, respectfully.

Although the invention has been described in its preferred forms with a certain degree of particularity, it is understood that the present disclosure has been made only by way of example and that numerous changes can be made without departing from the spirit and the scope of this invention.

What is claimed is:

1. A method of incorporating at least one ingredient in an article fabricated from a polymer which comprises immersing the article in a liquid and contacting the immersed article with a solution of the ingredient in a solvent, said liquid being one which is non-aggressive towards the article and which is immiscible with the solvent.

2. The method of claim 1 wherein the polymer is selected from the group consisting of polyvinyl chloride, polyethylene, polypropylene, polystyrene, polycarbonates, thermoplastic polyesters, thermoplastic acrylonitrile/butadiene/styrene copolymers, polyacrylates and polymethacrylates.

3. The method of claim 2 wherein the polymer is polyvinyl chloride.

4. The method of claim 1 wherein the liquid comprises an aqueous media.

5. The method of claim 4 wherein the aqueous media consists of water.

6. The method of claim 4 wherein the aqueous media consists of a mixture of water and methanol.

7. The method of claim 1 wherein the solvent is methylene chloride.

8. The method of claim 1 wherein the solvent is 1,2-dichloroethane.

9. The method of claim 1 wherein the ingredient is selected from the group consisting of ultraviolet light stabilizers, antioxidants, anti-static agents and pigments.

10. The method of claim 1 wherein the ingredient is an ultraviolet light stabilizer.

11. The method of claim 10 wherein the stabilizer is present in the solvent in a concentration of about 1 to about 10% by weight.

12. The method of claim 10 wherein the stabilizer is 2(2'-hydroxy-5'-t-octylphenyl)benzotriazole.

13. The method of claim 10 wherein the stabilizer is 2(2'-hydroxy-5'-t-methylphenyl)benzotriazole.

14. The method of claim 10 wherein the stabilizer is 2-hydroxy-4-methoxybenzophenone.

15. The method of claim 10 wherein the stabilizer is 2-hydroxy-4-n-octoxybenzophenone.

16. The method of claim 10 wherein the stabilizer is 2-ethyl-2-ethoxyanilide.

17. The method of claim 1 wherein the article is disposed in the liquid such that the solution contacts substantially only one surface thereof.

18. The method of claim 1 which is carried out in a continuous manner.

19. A continuous method of incorporating at least one ultraviolet light stabilizer in the surface region of an article fabricated from polyvinyl chloride which comprises the steps of:
(a) transporting the article through an aqueous media;
(b) contacting substantially only one surface of the article with a solution of the stabilizer in an organic solvent while the article is being transported through the aqueous media, said media being one which is non-aggressive towards the article and which is immiscible with the solvent; and
(c) displacing any residual solution remaining on the contacted surface.

20. The method of claim 19 wherein the aqueous media is water.

21. The method of claim 19 wherein the solvent has a density greater than 1.

22. The method of claim 21 wherein the solvent is methylene chloride.

23. The method of claim 19 wherein the concentration of the stabilizer in the solvent is in the range of 1 to 10 wt. %.

24. The method of claim 19 which is carried out at ambient temperature.

25. The method of claim 19 wherein the contacting of the surface occurs for a period of time such that the stabilizer is incorporated in the surface region of the article in an amount ranging from about 0.1 g to about 0.6 g per 100 g of article.

26. The method of claim 25 wherein the stabilizer is incorporated in the surface region of the article extending to a depth of about 200 microns.

27. The method of claim 25 wherein at least about 70% of the amount of stabilizer is concentrated in the upper 100 microns of the surface region.

28. A continuous process for incorporating at least one ultraviolet light stabilizer in the surface region of a sheet fabricated from polyvinyl chloride, said surface region extending to a depth of about 200 microns from the surface of the sheet, the amount of stabilizer incorporated in the surface region being in the range of 0.15 g to 0.6 g per 100 g of article, with at least 70% of such amount concentrated in the upper 100 microns of the surface region, comprising the steps of:
(a) transporting the sheet substantially horizontally through an upper water layer, there being a methylene chloride solution containing 10 to 40 wt. % of the stabilizer present as a bottom layer beneath the water layer;
(b) flowing the solution from the bottom layer through the upper water layer onto substantially only one surface of the sheet as the sheet is being transported through the water layer such that the solution is in contact with said surface for a period of time ranging from 1 seconds to two minutes; and thereafter (c) directing a jet of water onto the contacted surface to displace any residual solution on such surface.

29. The method of claim 1 which includes the step of displacing any residual solution remaining on the contacted surface.

30. The method of claim 29 wherein said displacing step is carried out by directing a jet of said liquid onto the contacted surface.

31. The method of claim 29 wherein both steps are carried out while substantially avoiding escape of solvent into the atmosphere.

32. The method of claim 30 wherein both steps are carried out while the article is immersed in said liquid.

33. The method of claim 19 wherein both steps are carried out while avoiding any significant amount of solvent into the atmosphere.

34. The method of claim 29 wherein both steps are carried out while avoiding escape of any significant amount of solvent into the atmosphere.

35. A continuous method according to claim 19 in which said article is siding for buidings.

* * * * *